June 13, 1961  J. A. REED  2,988,407
SUPPORT FOR STRUCTURE WHILE REMOVING BEARING
Filed April 8, 1959
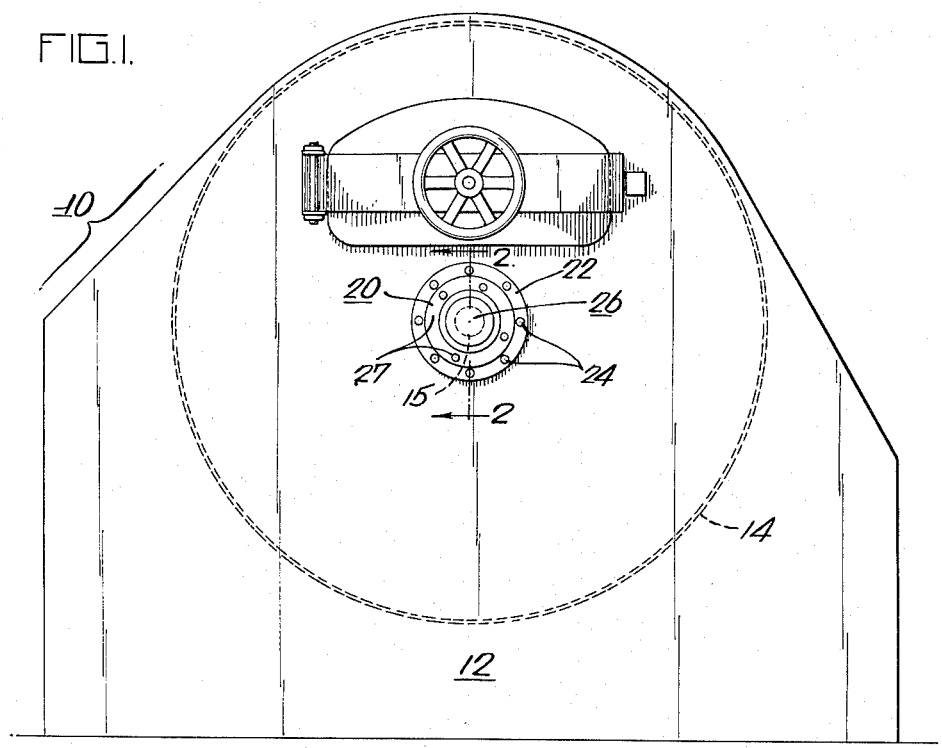
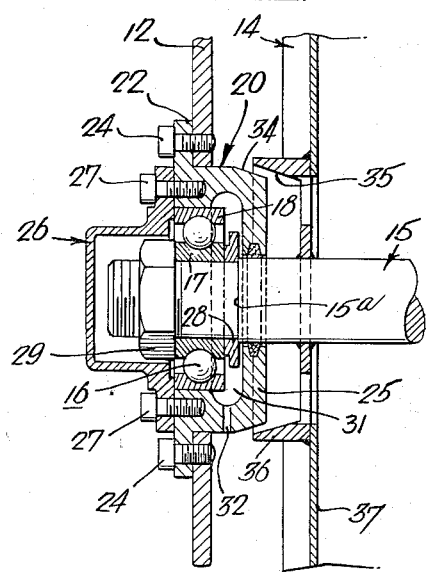
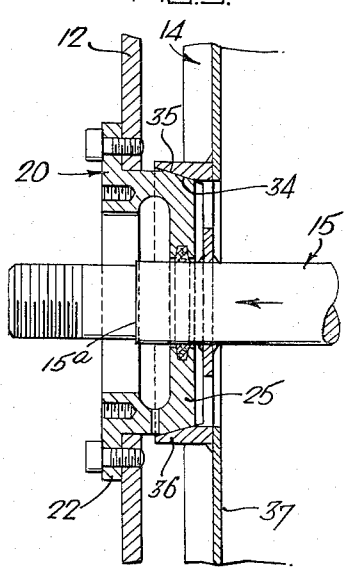
INVENTOR:
JOHN A. REED
BY
Howson & Howson
ATTYS.

United States Patent Office 2,988,407
Patented June 13, 1961

2,988,407
SUPPORT FOR STRUCTURE WHILE REMOVING BEARING

John A. Reed, Haddonfield, N.J.
(% Reed Bros., 1458–1462 Haddon Ave., Camden 3, N.J.)
Filed Apr. 8, 1959, Ser. No. 805,043
5 Claims. (Cl. 308—189)

The present invention relates generally to improvements in devices for maintaining a shaft supported on bearings in concentric alignment with the bearing housing while installing or replacing the bearings supporting the shaft. More particularly the invention is directed to improvements whereby the bearings supporting the shaft may be easily and quickly replaced.

The present invention is especially useful in dry cleaning machines or the like having a drum or cylinder mounted on a shaft that is journaled in a supporting structure. Due to the eccentric loading of the shaft, wear on the bearings is comparatively high, necessitating periodic replacement of the bearings which is difficult because of the size and weight of the machines.

Heretofore an hydraulic jack or the like has been used to support the shaft in proper position while removing the bearings. This procedure has not been satisfactory because of the close tolerances that exist between the shaft, bearing and bearing housing which requires extremely accurate positioning of the shaft in order to properly remove and replace the bearings.

By the present invention the shaft and bearing housing may be maintained in coaxial relationship with one another while removing a worn out bearing and replacing it with a new one. In addition, the present invention automatically centers or aligns the shaft in proper position for receiving the new bearing. The present invention provides a construction which is relatively simplified and inexpensive and may be employed to replace bearings with comparative ease and facility in a minimum of time.

FIG. 1 is an end view of one illustrated embodiment of the present invention shown in conjunction with a dry cleaning machine;

FIG. 2 is an enlarged sectional view taken along line 2—2 of FIG. 1; and

FIG. 3 is a sectional view similar to FIG. 2 showing the bearing removed and the shaft centrally positioned with respect to the bearing housing.

A typical embodiment of the present invention is shown in FIG. 1 wherein reference numeral 10 designates generally the housing of a dry cleaning machine or the like having spaced parallel side walls 12 which rotatably support a drum or cylinder 14. In the form of the invention illustrated, the drum 14 is fixedly mounted on a shaft 15 which is supported at each end by a bearing 16 mounted in the side wall 12 of the housing as hereinafter described. Customarily, the drum or cylinder shaft 15 may be geared or otherwise connected to a drive motor (not shown). The bearings 16 are shown as conventional anti-friction ball bearings having an inner race 17 mounted on the shaft 15 and an outer race 18 which is supported in an annular housing 20.

The bearing housing 20 has a radially outward extending peripheral flange 22 at its outer end which is secured to the side wall 12 by means of bolts 24. At its inner end the housing 20 has a flange 25 extending radially inward thereof and closely circumscribing the shaft 15. A cap member 26 is secured to the housing 20 by means of bolts 27 to enclose the shaft and bearing 16 against the entrance of dirt, dust and other foreign matter.

The bearing is retained in proper axial position in the bearing housing 20 by a spacer ring 28 provided between the bearing 16 and a shoulder 15a on shaft 15 and a lock nut 29 which is threaded on the end of the shaft 15. The bearing housing 20 is constructed to provide an annular channel 31 to collect any moisture which may accumulate in the housing, for example, due to condensation, and a downwardly extending bore 32 for draining by gravity any such moisture is provided at the bottom of the channel 31.

The normal operating relationship of the bearing and bearing housing relative to the drum is shown in FIG. 2 of the drawings. In order to support the drum 14 and shaft 15 coaxially of the bearing housing 20 for the purpose of removing and replacing the bearing 16, the bearing housing is provided at the inner end of the outer peripheral surface with a taper 34 which is adapted for cooperative interfitting engagement with a corresponding tapered surface 35 provided on the inner peripheral surface of a ring member 36 fixedly secured to the end wall 37 of the drum and projecting endwise therefrom in accurate concentric relationship with respect to the axis of the shaft 15.

Consequently, when it is desired to remove a worn out bearing and replace it with a new one it is merely necessary to remove the cap 26 and loosen the lock nut 29 at both ends of the shaft 15. The shaft 15 may then be shifted axially relative to the bearing housing 20 to engage the tapered surfaces 34, 35 as shown in FIG. 3, in which position the drum 14 and shaft 15 are supported coaxially with respect to the bearing housing 20. The bearing may now be removed and replaced with a new bearing. After installation of the new bearing, the lock nut 29 is threaded on to the shaft 15 and adjusted at both ends until the shaft 15 is moved to the operating position shown in FIG. 2.

From the foregoing it will be apperent that the present invention provides a novel improvement in devices for aligning a shaft in position so that bearings may be removed and replaced in quick and reliable manner.

While both support members have been shown as continuous, it will be understood that within the scope of the present invention one member could be continuous around its circular periphery whereas the other need supply only at least three spaced points defining a coaxial circle. Furthermore, instead of mating conical surfaces, in some embodiments of the invention only one surface may be conical and intended to make but line contact with a cooperating member. Additional modifications are possible within the scope of the present invention. It is not intended to limit the invention to the specific disclosure in any way and changes and modifications may be incorporated and embodied therein within the scope of the following claims.

I claim:

1. In a bearing mounting construction, a shaft, a fixed support structure for said shaft, a bearing rotatably mounting the shaft in predetermined radial position relative to said support structure, means to support the shaft in said predetermined radial position independently of the bearing, comprising, complementary members fixed respectively to the support structure and said shaft and adapted for coacting interfitting engagement upon relative axial displacement of the shaft with respect to said support structure.

2. Apparatus in according with claim 1 wherein at least one of the complementary members has a continuous circumferential portion operable to be engaged by the other of said complementary members.

3. Apparatus in accordance with claim 1 wherein at least one of the complementary members has a tapered surface adapted to engage said other complementary member.

4. Apparatus in accordance with claim 1 wherein at least one of the complementary members has a continuous circumferential portion and wherein both members have tapered surfaces adapted to provide a surface to surface engagement.

5. Apparatus in accordance with claim 1 wherein the complementary members have continuous tapered surfaces adapted to provide a surface to surface engagement.

References Cited in the file of this patent

UNITED STATES PATENTS

| | | |
|---|---|---|
| 1,742,826 | Sanders et al. | Jan. 7, 1930 |
| 2,665,954 | Sherrill | Jan. 12, 1954 |